Jan. 19, 1971 L. B. SIMON 3,556,584
VEHICLE OCCUPANT PROTECTIVE SEAT
Filed March 11, 1968 3 Sheets-Sheet 1

INVENTOR.
Lewis B. Simon

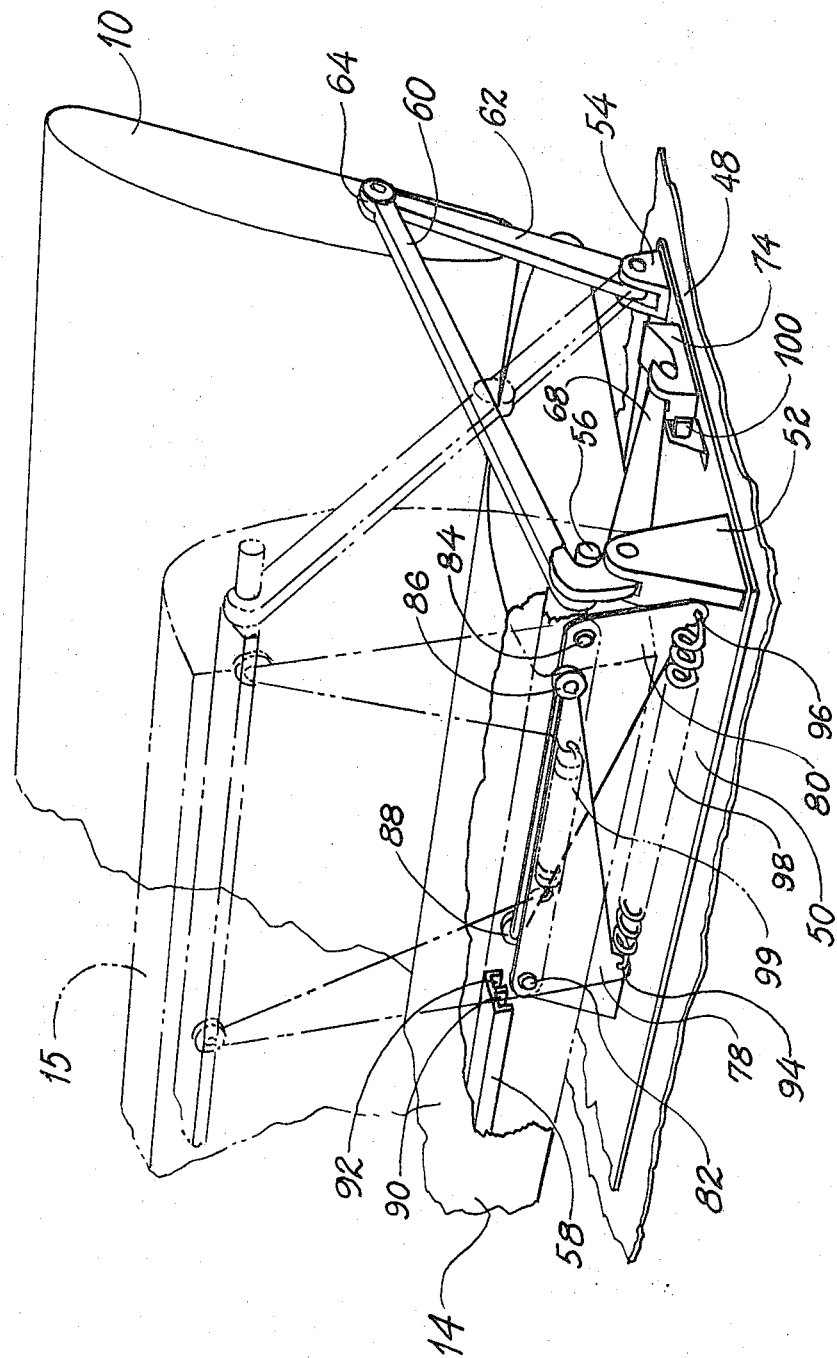

United States Patent Office 3,556,584
Patented Jan. 19, 1971

3,556,584
VEHICLE OCCUPANT PROTECTIVE SEAT
Lewis B. Simon, 1801 Joanne Way,
Oxnard, Calif. 93030
Filed Mar. 11, 1968, Ser. No. 712,147
Int. Cl. B60n 1/02
U.S. Cl. 296—65                                    1 Claim

ABSTRACT OF THE DISCLOSURE

A vehicle seat constructed so as to automatically enfold and protect the occupant in the event of a sudden vehicle deceleration. It includes a fixed seat back and a movable seat bottom. In operation the forward edge of the seat bottom is abruptly raised and the seat bottom is rotated so as to fold the occupant's body between it and the seat back.

BACKGROUND OF THE INVENTION (1) Field of the invention

The invention pertains to safety devices for moving vehicles and particularly to devices which are actuated upon occurrence of an emergency condition to restrain and cushion the vehicle occupant so as to protect him from violent impact with the vehicle interior or separation from the vehicle.

It is applicable to all moving vehicles including automobiles, busses, trucks, tanks, aircraft and boats and the principles of operation will readily be apparent to be applicable to any vehicle operation wherein sudden deceleration forces may occur including deceleration forces encountered by space vehicles during re-entry.

(2) Description of the prior art

Heretofore numerous harness means have been proposed to restrain vehicle occupants while subjected to abrupt deceleration and deflection forces. Such restraints have numerous well-know deficiencies and, though they many retain the occupant within the vehicle, they are also capable of causing injury. Furthermore, their use is frequently uncomfortable and requires preliminary attachment and critical adjustment before they are effective. Finally there is a tendency to ignore their presence and to fail to put them to use.

A movable seat structure has also been proposed wherein the entire seat swings as an assembly in an arcuate path in order to lift the seat bottom upwardly into the normal path into which the occupant's body is thrown. Such constructions have proven to be objectionable in that a great excess of room is required within the vehicle and furthermore these constructions are ineffective since no restraint or protection is afforded the upper portion of the occupant's body.

SUMMARY OF THE INVENTION

The present invention comprises a seat back and operable seat bottom portion which latter is so mounted that the leading edge is abruptly raised when excessive deceleration occurs, this raising action serving to lift the articulated leg of the occupant at the knee joint and interpose itself into the line of normal momentum while at the same time folding and cushioning the vehicle occupant between such upraised seat and the vehicle seat back. It is actuated by quick acting deceleration sensing means which quickly unlatches a seat raising mechanism to effect the aforesaid raising and rotating function.

Other objects, advantages, and novel features of the invention will become apparent from the following detailed description of the invention when considered in conjunction with the accompanying drawings.

BRIEF DESCRIPTION OF THE DRAWINGS

FIG. 2 is a change position perspective view of the seat of FIG. 1 showing the details of the mechanism which raises the front edge of the seat upon sudden deceleration.

DESCRIPTION OF THE PREFERRED EMBODIMENT

Figure 1:
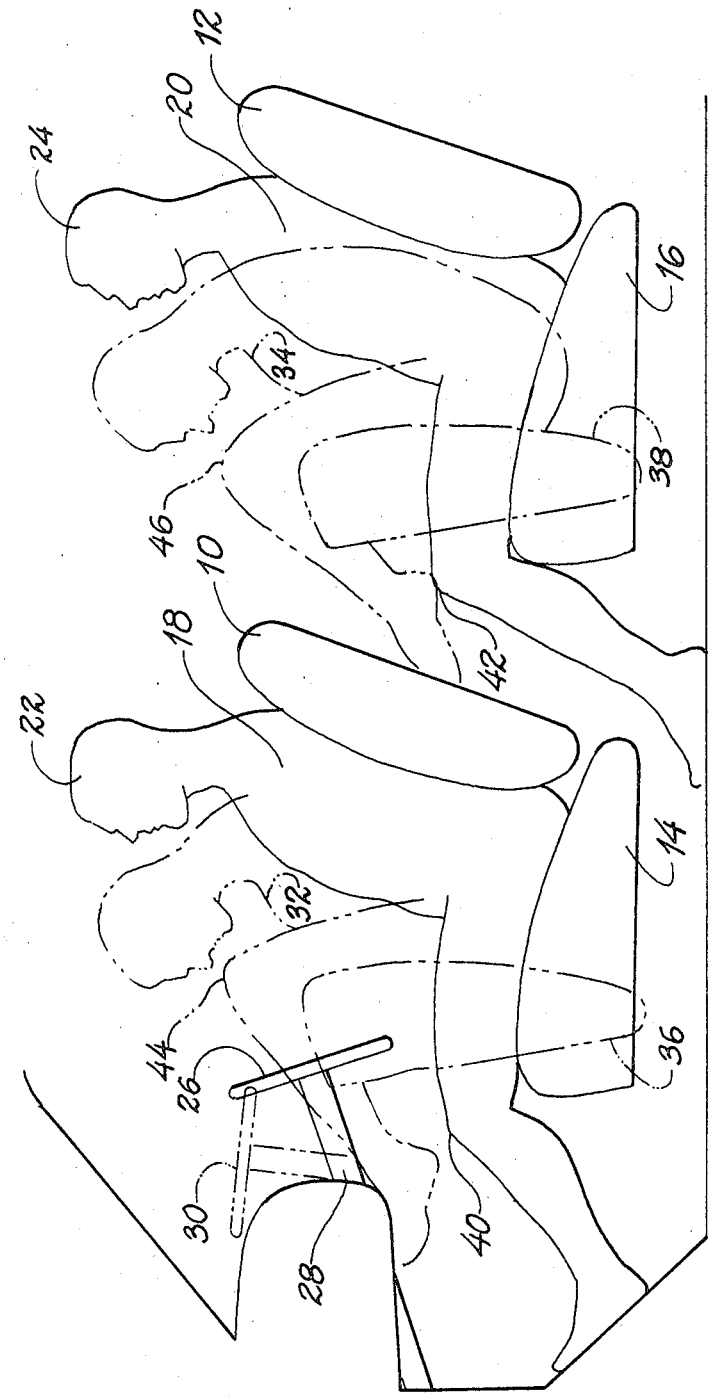
FIG. 1 is a diagrammatic change position side view showing the seat of the present invention in normal relationship in solid lines and in fully actuated position in dot-dash lines.

Referring now to the drawings in detail there is shown in FIG. 1 a seat construction comprising front and rear seat backs 10 and 12 which have corresponding seat bottom portions 14 and 16. The front seat has an occupant depicted in solid lines 18 while the rear seat has a similar occupant depicted in solid lines 20. Each has an upright head portion 22 and 24 respectively.

In front of the vehicle driver 18 is a control device such as the conventional steering wheel 26 which is preferably hinged or otherwise actuated at point 28 so as to be movable to an out-of-the-way position shown in dotted lines as 30.

In carrying out the present invention there is provided suitable means whereby the front and rear vehicle occupants 18 and 20 may be moved into their illustrated dotted line positions 32 and 34 upon sudden deceleration of the vehicle as, for example, when it strikes an object. When this occurs the seat bottoms 14 and 16 are rapidly moved into changed positions illustrated by dotted lines 36 and 38, simultaneously lifting the knee portions 40 and 42 of these occupants to the changed positions shown in dotted lines 44 and 46 respectively. The vehicle control or steering wheel structure 26 is so constructed that any interference by said structure of the motion of seat part 14 will cause it to fold at point 28 to the dotted line change position 30.

Referring now to FIG. 2 there is illustrated a seat actuating mechanism together with an inertia sensing tripping device and associated linkage which will effect the aforesaid sudden change in the orientation of the vehicle seat. In this drawing, the vehicle floor 48 is shown provided with a seat mounting platform 50 upon which a seat bottom 14 may be supported in the illustrated solid line relationship with a seat back 10. It will be apparent that although only the front vehicle seat is hereafter shown and described, a corresponding construction is applicable to the rear passenger seat and to any other seats in a multi-seated vehicle.

Though in FIG. 2 only the left end of the seat mechanism is illustrated it will be apparent that a similar inertia sensing and seat actuating mechanism may be employed at the opposite or right end of the seat and furthermore it will be apparent that the inertia sensitive members may be linked together by cables, rods or the like or electrically so that they operate in unison and so that the forward edge of the seat bottom is abruptly released from both ends simultaneously.

As shown in FIG. 2, upstanding forward and aft stanchions 52 and 54 pivotally receive portions of the articulated mechanism. Furthermore it will be apparent that the forward edge of the seat incorporates a special transversely disposed combination trip rod 56 and dual roller track interconnecting assembly 58. The trip rod 56 being journaled in the forward end of a long toggle arm 60 and so rotatable that the dual roller track interconnecting assembly 58 may be kept in a normal position despite rotation of the seat thereabout.

The articulating linkage includes a short toggle arm 62 having a knee portion 64 interconnecting it with the longer toggle arm 60 and the lower end of the short toggle arm 62 is journaled in the stanchion 54.

Figure 3:
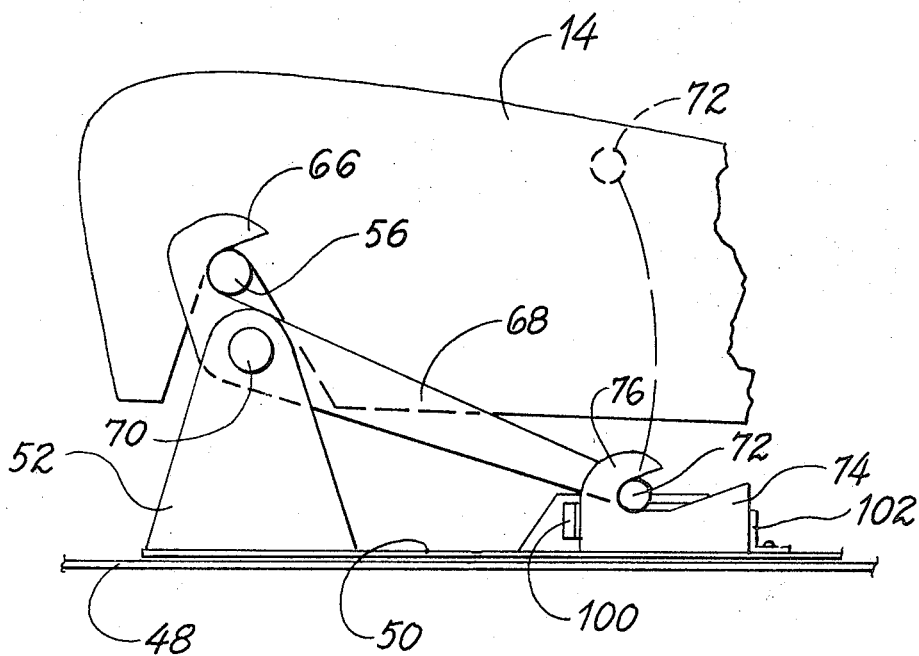
FIG. 3 is an enlarged, detailed side view of the deceleration sensing means in the cocked or ready position.

Examining for a moment FIG. 3 it will be observed that the outer end of trip rod 56 is normally restrained against upward vertical movement by the inclined lower face of toe 66 of a release arm 68 which in turn is journaled at point 70 and has an inertia block restrained tip 72. As long as the arm 68 is kept in the position illustrated in FIG. 3 the trip rod 56 and the front end of the seat are kept securely locked in the lowered position.

Figure 4:
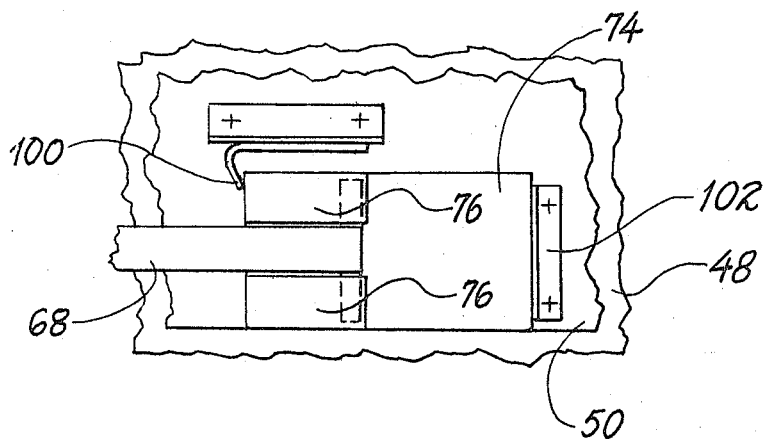
FIG. 4 is a detailed top plan view of the deceleration sensing means of FIG. 3.

An inertia sensitive member which, if desired, may be in the form of a forwardly movable block 74 may be supported in the manner shown in FIGS. 3 and 4 so that the toe 76 overlies the tip 72 and normally restrains said tip 72 from arcuate upward movement which would have the effect of clearing toe 76 from tip 72 and permitting the release arm 68 to rotate about pinion point 70 causing the trip rod restraining toe 66 to move out of the path of trip rod 56 to release the forward edge of the seat. It is important that sufficient force be available to quickly raise the forward edge of the seat upon vehicle impact above a pre-selected amount and accordingly in the present invention there is shown one form of resilient seat-erecting linkage which in FIG. 2 may comprise triangularly shaped plates 78 and 80 hinged about pivot points 82 and 84 respectively and carrying at one apex thereof rollers 86 and 88 which normally ride in downwardly directed grooves 90 and 92 respectively. These grooves 90 and 92 are in the undersurface of the elongate transversely extending assembly 58 mentioned previously.

The remaining corners of the triangularly shaped plates 78 and 80 are provided with openings to receive the opposite ends 94 and 96 of a tension spring 98. Though illustrated as a tension spring, it will be apparent that the force means may be hydraulic, expanding gases, electrical, compression springs or other energy storing or transferring means.

From FIG. 4 it will be observed that the inertia block 74 is normally restrained against forward movement by a resilient device such as yieldable detent 100 which normally holds the inertia sensitive device in the position shown, snugly pressing against a positioning ledge 102. Though illustrated as a resilient or deformable member it will be apparent that a shear pin or any other sudden release mechanism may be employed and that movement of the block forward will release inertia block restrained tip 72. Though the inertia sensitive means is illustrated as a block, it will be apparent that many forms of state of the art accelerometers may be applied operating the releasing means electrically.

Though the preferred embodiment has been illustrated with a weight inertia sensing means releasing a seat restraining means and a tension spring means upwardly forcing the forward edge of the seat, it will be apparent that the result delineated in FIG. 1 could be achieved by use of an accelerometer which when a predetermined level of acceleration is reached actuates releasing means for springs, electrical energy, fluid pressure or compressed gases or actuates gas generating means which through piston and linkage or other means would quickly achieve the desired seat motion.

OPERATION

Upon application to the vehicle of a sudden deceleration in excess of that for which the inertia sensitive movable block 74 is designed to be restrained by detent 100, such block (or blocks on opposite ends of the seat construction) will deform the detent 100, release inertia block restrained tip 72, permit arm 68 to rotate about pivot 70 moving toe 66 out of the path of trip rod 56 and allow the contraction of tension spring 98 to rotate the triangular plates 78 and 80 about their respective pivots 82 and 84 to draw rollers 86 and 88 in opposite directions along tracks 90 and 92 respectively to the change position illustrated in FIG. 2. During this operation, the long and short toggle legs 60 and 62 are straightened by articulation of joint 64 into a straight elongate member shown in dotted lines in that figure and as a consequence the vehicle occupant is moved into the folded position illustrated in FIG. 1 with the seat 14 interposed between himself and his forward line of travel. At the same time the occupant's head 22, though it may swing forward to the changed position in FIG. 1, is kept from contact with the vehicle interior. Though illustrated as toggle legs, it will be apparent that many forms, would accomplish the same result, such as a telescoping leg, and the linkage could be covered with resilient material to form an arm rest or side guard and prevent lateral displacement which could cause injury.

It will be apparent that with this action the vehicle occupant is cushioned between opposed yielding surfaces and is kept from being thrown forwardly and, to a large extent is prevented from lateral or deflecting movement due to the fact that he is compressed between resilient cushion-like members.

I claim:
1. A protective seat for a vehicle occupant, said seat comprising:
   a cushioned back portion designed to retain a substantially upright position relative to the body of said vehicle;
   a cushioned bottom portion movable from a normally substantially horizontal position in which it supports the vehicle occupant to a substantially upright position in which the two said seat portions assume an essentially parallel spaced-apart relationship for receiving at least a portion of the body of the vehicle occupant in effect "sandwiched" therebetween;
   means for guiding the movement of said seat bottom portion so that the forward edge of its upper surface undergoes a vertical displacement with respect to its rear edge, such upper surface thus forming such an angle with the horizontal that said seat bottom portion in effect becomes a barrier to any appreciable forward motion of the occupant "sandwiched" between it and the said seat back portion;
   a side guard, and means for erecting said side guard as a function of, and simultaneously with, the movement of said seat bottom portion from horizontal to upright position, said side guard acting to restrain excessive lateral displacement of the vehicle occupant from between said facing seat portions;
   normally inactive means for urging said seat bottom portion from its normally substantially horizontal position to its upright position;

latch means acting to maintain said first-mentioned means in its normally inactive condition; and means for leasing said latch means;

whereby said first-mentioned means is rendered active to urge said seat bottom portion to its upright position, said movement being arcuate in nature.

References Cited

UNITED STATES PATENTS

| | | | |
|---|---|---|---|
| 2,433,950 | 1/1948 | Henderson | 244—122X |
| 2,735,476 | 2/1956 | Fieber | 296—65X |
| 2,789,650 | 4/1957 | Krous | 296—65X |
| 2,922,461 | 1/1960 | Braun | 297—216 |
| 2,736,566 | 2/1956 | Hartl | 280—29 |

FOREIGN PATENTS

| | | | |
|---|---|---|---|
| 902,348 | 1/1954 | Germany | 296—65(.1) |

OTHER REFERENCES

Amler: German printed application, February 1964.

RICHARD J. JOHNSON, Primary Examiner

U.S. Cl. X.R.

297—216